United States Patent [19]

Sasabe et al.

[11] 3,939,940

[45] Feb. 24, 1976

[54] INTERLOCKING DEVICE FOR A MANUAL POWER TRANSMISSION SYSTEM

[75] Inventors: Yukiyoshi Sasabe; Kunihiko Suzuki, both of Yokohama, Japan

[73] Assignee: Nissan Motor Co., Ltd., Yokohama, Japan

[22] Filed: Sept. 20, 1974

[21] Appl. No.: 507,880

[30] Foreign Application Priority Data
Nov. 5, 1973  Japan.................... 48-127134[U]

[52] U.S. Cl.............. 180/82 C; 180/82 A; 180/101; 70/248
[51] Int. Cl................................................ B60r 21/10
[58] Field of Search........ 180/82 C, 82 A, 114, 101; 70/245, 247, 248, 202, 201; 74/473, 475

[56]  References Cited
UNITED STATES PATENTS

| | | | |
|---|---|---|---|
| 1,622,839 | 3/1927 | Peterson | 70/247 X |
| 2,890,581 | 6/1959 | Lewis | 70/248 |
| 3,729,059 | 4/1973 | Redmond | 180/82 C |
| 3,805,635 | 4/1974 | Grosseau | 74/473 P |
| 3,859,625 | 1/1975 | Eggert | 180/82 C |

*Primary Examiner*—Kenneth H. Betts

[57]  ABSTRACT

Herein disclosed is an interlocking device for locking the gear-shift mechanism of an automotive manually operated power transmission system which is cooperative with a vehicle safety arrangement such as a safety belt, the interlocking device comprising a first movable member movable with a suitable movable member forming part of the gear-shift mechanism such as for example the rotatable guide member for the striking rod of the gear-shift mechanism, a second movable member movable into locking engagement with the first movable member and means responsive to complete protective condition of the safety arrangement for holding the second movable member in locking engagement with the first movable member if and when the safety arrangement is left unused or in an incomplete protective condition.

4 Claims, 10 Drawing Figures

INTERLOCKING DEVICE FOR A MANUAL POWER TRANSMISSION SYSTEM

The present invention relates generally to power transmission systems of automotive vehicles and, more particularly, to an interlocking device for use with a manually-operated shift mechanism of an automotive power transmission mechanism.

To protect a vehicle occupant in the event of a collision encountered by the vehicle, the vehicle is equipped with a safety belt arrangement which is adapted to restrain the vehicle occupant when the occupant is violently forced forward. Because of the unwieldy procedures which are necessitated for mounting the seat belt on the vehicle occupant, however, there is a tendency that the seat belt arrangement is left unused during cruising of the vehicle. A device has therefore been proposed which is operative to produce a warning signal and simultaneously makes the engine inoperative to start until the seat belt is mounted on the vehicle occupant in a predetermined mode of manipulative procedure.

The present invention proposes to lock the gearshift mechanism of a manually operated power transmission system in a position providing only limited gear ratios if and whenever the safety belt is left unused or prescribed manipulative procedure required to mount the safety belt on a seat occupant of a vehicle is incomplete with the engine started.

In accordance with the present invention, there is provided an interlocking device which comprises a first movable member which is movable with a movable member forming part of the gear-shift mechanism of a manually-operated power transmission system, a second movable member having a first position disengaged from the first movable member and a second position in interlocking engagement with the first movable member, electromagnetically operated actuating means having an operative condition to actuate the second movable member into the second position thereof, and an electric control circuit responsive to a seated condition of a vehicle occupant and to a complete protective condition of a safety arrangement.

In a preferred embodiment of the interlocking device according to the present invention, the first movable member may be in engagement with a rotatable guide member axially movably receiving a striking rod of the gear-shift mechanism and rotatable between different angular positions each providing usually two forward speed gear ratios which are arrayed in a row in a gear-shift pattern of the power transmission system. In this instance, the first movable member may be formed with a recess through which the second movable member is in locking engagement when held in the above-mentioned second position. The second movable member may be a solenoid-operated plunger which is movable into and out of an axial position fitting at its leading end into the recess thus formed in the first movable member. The electric control circuit may include a series combination of a first switch responsive to the seated condition of the vehicle occupant and a second switch responsive to the completely mounted condition of the safety belt.

The features of the interlocking device thus generally constructed and arranged will become more apparent from the following description taken in conjunction with the accompanying drawings, in which.

Figure 1:
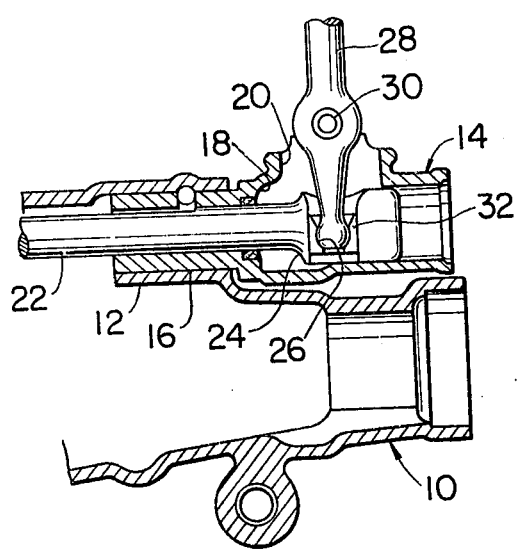
FIG. 1 is a longitudinal sectional view showing part of a gear-shift mechanism of an ordinary manually operated power transmission system.

Referring to the drawings, first to FIG. 1, the gear-shift mechanism of a manually operated power transmission system is usually positioned in a rear extension 10 of a transmission case incorporating therein gears, shafts, synchronizing rings and clutch assemblies though not shown. The rear extension 10 of the transmission case is formed with a bored cylindrical portion 12. A striking rod guide member 14 has a bored cylindrical portion 16 which is rotatably received in the bored cylindrical portion 12 of the transmission case rear extension 10 as shown. The striking rod guide member 14 is formed with a cavity 18 which is located at the rear of the bore in the cylindrical portion 16 of the guide member 14. The cavity 18 is open to the outside through an opening 20 which is located over the cavity 18. A striking rod 22 is axially slidably received in the bored cylindrical portion 16 of the striking rod guide member 14 and has a rearmost axial portion 24 projecting into the cavity 18 in the guide member 14. In this rearmost axial portion 24 of the striking rod 22 is formed a substantially spherical socket 26 which is directed toward the opening 20 in the guide member 14. A gear-shift lever 28 is rockable about a pivot 30 and has a substantially spherically shaped end portion 32 which fits into the socket 26 in the rearmost axial portion 24 of the striking rod 22 as shown. When the gear-shift lever 28 is turned clockwise or counterclockwise about the pivot 30 by a human effort, then the striking rod 22 is axially moved in either direction relative to the transmission case rear extension 10 through engagement between the socket 26 in the striking rod 22 and the spherical end portion 32 of the gear-shift lever 28.

Figure 2:
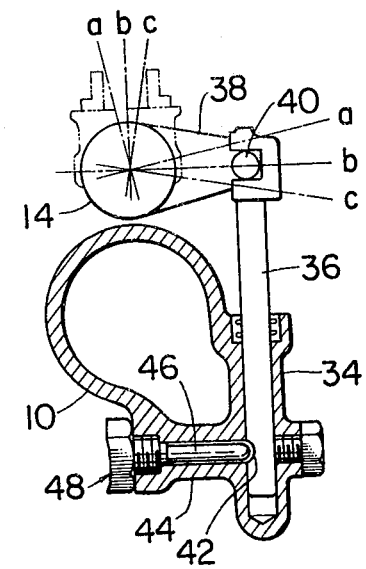
FIG. 2 is a cross sectional view showing a mechanical arrangement of a preferred embodiment of the interlocking device according to the present invention as may be incorporated into the gear-shift mechanism illustrated in FIG. 1.

Turning to FIG. 2, the rear extension 10 of the transmission case is further formed with a bored portion 34 extending in a direction transverse to an axis of rotation of the striking rod guide member 14. Where desired, the bored portion 34 may be formed separately of the rear extension 10 of the transmission case and rigidly connected to the transmission case rear extension 10 by suitable fastening means such as bolts, though not shown as such. A sliding rod 36 is axially slidably received in the bored portion 34 and has a leading end portion axially projecting out of the open end of the bored portion 34 and terminating approximately sidewise of the striking rod guide member 14 as shown. The sliding rod 36 is engaged at its leading end portion by the striking rod guide member 14 by means of a lever 38 which is rigidly connected at one end to the guide member 14 and pivotally connected at the other end to the leading end portion of the sliding rod 36 through a pivotal pin 40 having an axis which is substantially in parallel to the axis of rotation of the striking rod guide member 14 as will be better seen in FIG. 3. The sliding rod 36 has a recess 42 in its end portion opposite to the end portion connected to the lever 38.

The rear extension 10 of the transmission case is further formed with a bored portion 44 which has an axial bore directed substantially at a right angle to and terminating in the bore in the previously mentioned bored portion 34 or, more specifically, in an axial end portion of the bore in the bored portion 34 opposite to the open end of the bored portion 34 as seen in FIG. 2. The recess 42 in the sliding rod 36 is thus movable over the leading end of the axial bore in the bored portion 44. A solenoid-operated plunger 46 is axially movable in the axial bore in the bored portion 44, having its leading end slightly projected out of the axial bore in the bored portion 44 into the bore in the bored portion 34 receiving the sliding rod 36. When the recess 42 in the sliding rod 36 happens to be located over or in alignment with the leading end of the axial bore in the bored portion 44, then the leading end of the solenoid-operated plunger 46 in the axially projected condition fits into the recess 42 in the sliding rod 36 as shown in FIG. 2.

Figure 5A:
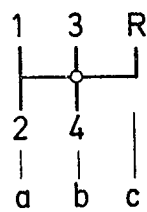
FIGS. 5a to 5f are schematic views showing various different gear-shift patterns which are presently in use in the existing manually operated power transmission systems.

The striking rod 22 is connected to gear-shift forks (not shown) and each of the forks is moved between two different angular positions providing respective gear positions when the striking rod guide member 14 and the striking rod 22 per se are rotated about their common axis of rotation by a human effort during gear shift. Thus, the striking rod guide member 14 is arranged to be rotatable about its axis usually between three different angular positions, viz, first, second and third angular positions which are indicated by *a*, *b* and *c*, respectively, in FIG. 2. (If, in this instance, the gear-shift pattern is arranged in a four-forward-speed and one-reverse-speed transmission system as indicated in FIG. 5*a*, the first angular position *a* will provide the first or second forward speed gear ratio 1 or 2, the second angular position *b* will provide the third or fourth forward speed gear ratio 3 or 4, and the third angular position *c* will provide the reverse gear ratio R.) As the striking rod guide member 14 is thus rotated between these three different angular positions *a*, *b* and *c*, then the sliding rod 36 will be axially moved between three different axial positions corresponding respectively to the angular positions *a*, *b* and *c* of the guide member 14 by reason of the pivotal connection between the sliding rod 36 and the lever 38. In the embodiment shown in FIG. 2, the recess 42 is assumed to be in alignment with the leading end of the axial bore in the bored portion 44 when the sliding rod 36 is moved to the axial position corresponding to the second angular position *b* of the striking rod guide member 14.

The solenoid-operated plunger 46 is actuated to move into or out of the axial position projecting into the bore in the bored portion 34 by means of a solenoid which is generally designated by reference numeral 48. The solenoid 48 is largely composed of an armature core mechanically connected to the plunger 46 and an exciting coil surrounding the armature core, though not shown in the drawings, as is customary. The solenoid 48 is assumed, by way of example, as being biased into a condition holding the plunger 46 in an axially retracted position and being actuated into a condition causing the plunger 46 to project forward when the exciting coil thereof is energized from an external power source. The solenoid 48 is energized and deenergized under the control of an electric control circuit which is illustrated in FIG. 4.

Figure 4:
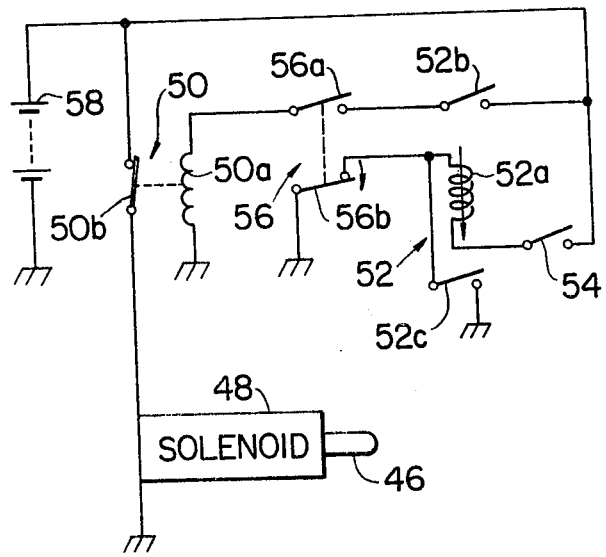
FIG. 4 is a schematic circuit diagram which shows a preferred example of an electric control arrangement of the interlocking device embodying the present invention.

Referring to FIG. 4, the electric control circuit comprises first and second relays 50 and 52 and first and second switches 54 and 56. The first relay 50 consists of a relay coil 50*a* and a normally closed movable contact 50*b* which is to be open when the relay coil 50*a* is energized from a power source 58. The movable contact 50*b* of the first relay 50 is connected between the exciting coil of the solenoid 48 and the power source 58 so that the solenoid 48 is energized when the normally closed movable contact 50*b* is kept closed as shown. The second relay 52 consists of a relay coil 52*a* and first and second normally open movable contacts 52*b* and 52*c* which are to be closed when the relay coil 52*a* is energized. The first switch 54 is biased to open and is closed responsive to seated condition of a vehicle occupant who usually is a driver of the vehicle in the present context. The second switch 56 has a normally open movable contact 56*a* and a normally closed movable contact 56*b*. The normally closed movable contact 56*b* of the second switch 56 is adapted to open responsive to a condition in which the safety belt arranged in the vehicle is completely fitted on the vehicle occupant by a prescribed manipulative procedure taken by the occupant of the seat. The two movable contacts 56*a* and 56*b* of the second switch 56 are mechanically interconnected together as indicated by a broken line in FIG. 4 so that the normally open movable contact 56*a* is closed when the normally closed movable contact 56*b* is open responsive to completion of the prescribed manipulative procedure to mount the safety belt on the seat occupant. The relay coil 50 of the first relay 50*a* is grounded at one terminal and connected at the other terminal to the positive terminal of the power source 58 over a series combination of the first normally open movable contact 52*b* of the second relay 52 and the normally open movable contact 56*a* of the second switch 56. The relay coil 50*a* of the first relay 50 is energized and accordingly the normally closed movable contact 50*b* of the relay 50 is open when both of the first normally open movable contact 56*a* of the second switch 56 are closed concurrently. The relay coil 52*a* of the second relay 52 has an input terminal connected across the first switch 54 to the positive terminal of the power source 58 and an output terminal connected to ground across the normally closed movable contact 56*b* of the second switch 56. The output terminal of the relay coil 52*a* of the second relay 52 is further connected to ground across the second normally open movable contact 52*c* of the second relay 52.

Figure 3:
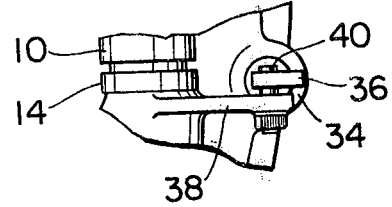
FIG. 3 is a fragmentary top plan view showing part of the mechanical arrangement illustrated in FIG. 2.
Figure 5B:
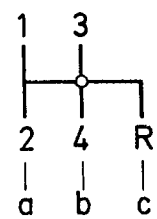
Figure 5C:
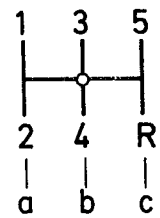
Figure 5E:
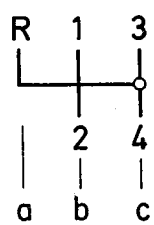
Figure 5D:
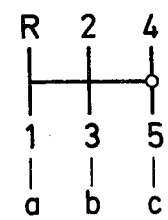
Figure 5F:
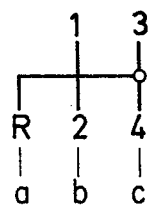

When, in operation, the vehicle occupant or the driver enters the vehicle cabin and is thereafter seated on the seat which usually is the driver's seat, then the first switch 54 closed. Because, at this instance, the safety belt is in a condition not mounted on the occupant of the seat, the normally closed movable contact 56*b* of the second switch 56 remains closed so that the relay coil 52*a* is energized from the power source 58 when the first switch 54 is closed. The relay coil 52*a* of the second relay 52 being thus energized from the power source 58, the normally open movable contacts 52*b* and 52*c* of the relay 52 are concurrently closed. If the vehicle driver then starts the engine with the safety belt unused or in a condition uncompletely mounted on the driver, the normally closed movable contact 56*b* of the second switch 56 is maintained in a closed condition so that the normally open movable contact 56a coacting with the former is kept open. The relay coil 52a of the first relay 52 thus remains de-energized and accordingly the normally opened movable contact 52b of the relay 52 is kept closed. Under these conditions, the solenoid 48 is energized from the power source 58 so that the plunger 46 shown in FIG. 3 is urged toward the bore in the bored portion 34 and, if the sliding rod 36 is moved to the axial position corresponding to the second angular position b of the striking rod guide member 14 of the gear-shift mechanism, the plunger 46 is brought into locking engagement with the sliding rod 36 through the recess 42 formed in the rod 36. The sliding rod 36 is thus locked in the particular axial position with the result that the striking rod guide member 14 and accordingly the gear-shift mechanism as a whole is held locked in a position providing the third or fourth forward speed gear ratio 3 or 4 if the gear-shift pattern of the transmission system is arranged as indicated in FIG. 5a, 5b or 5c. If, in this instance, the gear-shift pattern of the transmission system is such that is shown in FIG. 5d, then the gear-shift mechanism will be held locked in a position providing the second or third forward speed gear ratio 2 or 3 and, if the gear-shift pattern is arranged as indicated in FIG. 5e or 5f, then the gear-shift mechanism will be held locked in the first or second forward speed gear ratio 1 or 2. The position of the gear-shift mechanism to be locked responsive to the unused or incompletely mounted condition of the safety belt may be, in any event, selected by varying the relative axial position of the recess 42 in the sliding rod 36 relative to the plunger 46.

When, however, the occupant of the seat has properly proceeded with the prescribed steps to fit the safety belt on him, then the normally closed movable contact 56b of the second switch 56 will open to cause the normally open movable contact 56a to close. A closed circuit is now completed by the relay coil 50a of the first relay 50, the first movable contact 52b of the second relay 52, the movable contact 56a of the second switch 56 and the power source 58. The relay coil 50a of the first relay 50 is thus energized from the power source 58 and, as a consequence, the normally closed movable contact 50b of the first relay 50 is caused to open. The solenoid 48 is now de-energized so that the plunger 46 is actuated to retract from the bore in the bored portion 34 and is accordingly disengaged from the sliding rod 36. The gear-shift mechanism is thus unlocked and may be moved to any of the positions desired. When the normally closed movable contacts 56b of the second switch 56 is open upon completion of the prescribed manipulative procedure followed by the seat occupant, the relay coil 52a of the second relay 52 is grounded through the second normally open movable contact 52c which has been closed responsive to closing of the first switch 54. The first normally open movable contact 52b of the second relay 52 is, in this manner, maintained closed when the normally closed movable contact 56b of the switch 56 is made open. The second switch 56 is arranged so that the normally closed movable contact 56b thereof is kept open once it has been made open in response to the completion of the prescribed manipulative procedure to mount the safety belt on the vehicle occupant unless the vehicle is for a second time brought into a full stop and the two switches 54 and 56 are made open with the safety belt dislodged from the seat occupant and with the vehicle occupant unseated.

While the interlocking device embodying the present invention has thus far been described and shown as being so arranged as to lock the striking rod guide rod of the gear-shift mechanism, such is merely by way of example and, therefore, the device according to the present invention may be modified so that any movable member contained in the gear-shift mechanism may be locked in a position providing certain gear positions which are arrayed in a row in the gear-shift pattern of the power transmission system.

What is claimed is:

1. In an automotive manually operated power transmission having a gear-shift mechanism including a rotatable guide member for a striking rod, an interlocking device for interlocking the gear-shift mechanism responsive to incompletion of prescribed manipulative procedure taken by a vehicle occupant, comprising a first movable member which is movable with a movable member forming part of said gear-shift mechanism, a second movable member having a first position disengaged from said first movable member and a second position in interlocking engagement with the first movable member, electromagnetically operated actuating means having an operative condition to actuate said second movable member into said second position thereof, an electric control circuit responsive to completion of said prescribed manipulative procedure taken by the vehicle occupant and in which said first movable member is in engagement with said rotatable guide member.

2. An interlocking device as set forth in claim 1, in which said first movable member is formed with a recess through which said second movable member is engageable with the first movable member.

3. An interlocking device as set forth in claim 2, in which recess is located in said first movable member to be in correspondence with a certain angular position of said guide member.

4. In an automotive manually operated power transmission having a gear-shift mechanism including a rotatable guide member for a striking rod, an interlocking device for interlocking the gear-shift mechanism responsive to incompletion of prescribed manipulative procedure taken by a vehicle occupant, comprising a first movable member which is movable with a movable member forming part of said gear-shift mechanism, a second movable member having a first position disengaged from said first movable member and a second position in interlocking engagement with the first movable member, electromagnetically operated actuating means having an operative condition to actuate said second movable member into said second position thereof, and an electric control circuit responsive to completion of said prescribed manipulative procedure taken by the vehicle occupant, in which said electric control circuit comprises a normally closed relay switch connected to said electromagnetically operated actuating means, a first circuit connected to said relay switch and having a normally opened first relay switch, a normally opened switch which is closed in response to completion of said prescribed manipulative procedure taken by the vehicle occupant, and a first relay coil, a second circuit connected to said normally closed relay switch and having a normally opened switch which is closed in response to seated condition of the vehicle occupant, a second relay coil, and a normally closed switch which is opened when said switch responsive to completion of said prescribed manupulative procedure is closed, and a third circuit connected to said second relay coil and having a normally opened second relay switch being opened when said first relay coil is energized, said normally opened first and second relay switches being closed when said second relay coil is energized.

* * * * *